May 9, 1939. F. A. BEST 2,157,950
COVER FOR STEERING WHEELS
Filed Dec. 21, 1936
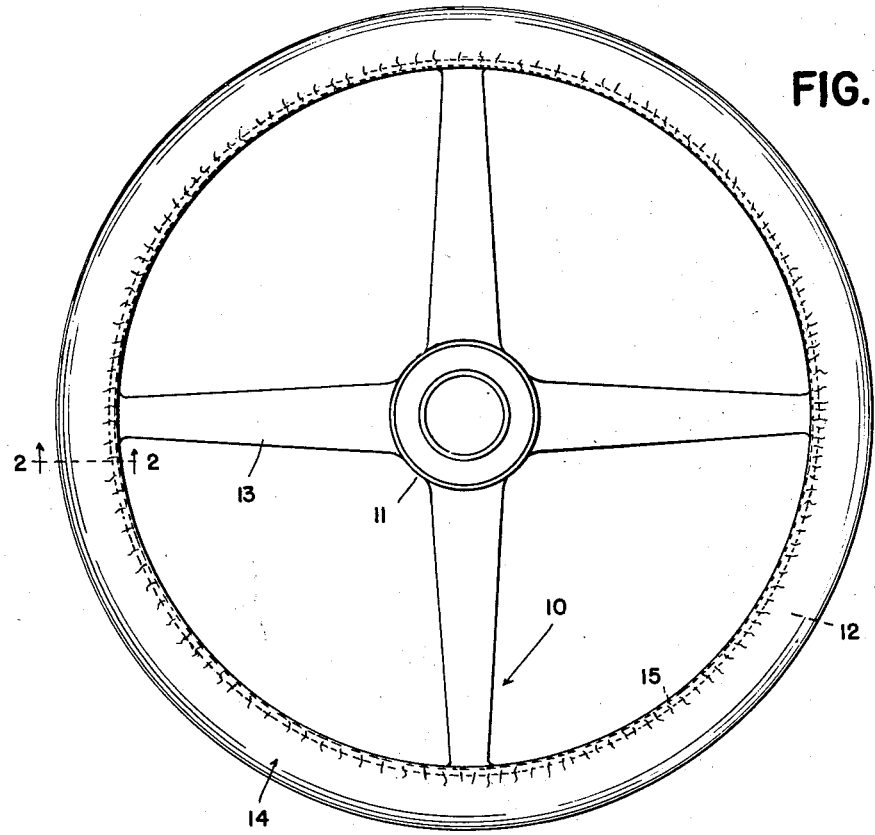
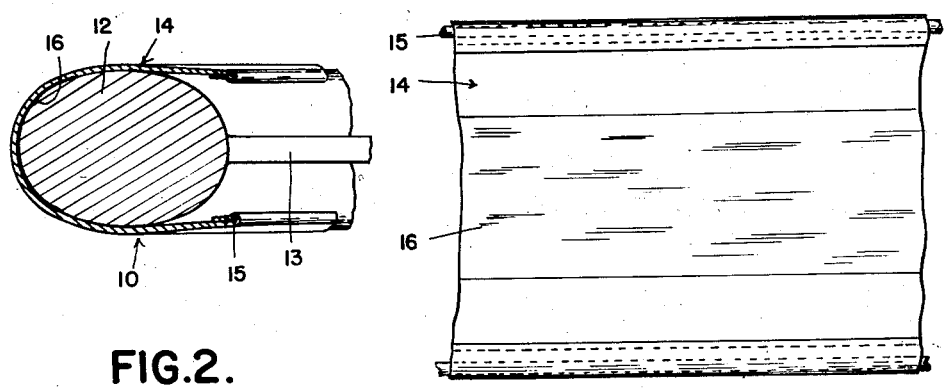
INVENTOR
FRANK A. BEST
BY
ATTORNEYS Patented May 9, 1939

2,157,950

UNITED STATES PATENT OFFICE 2,157,950

COVER FOR STEERING WHEELS

Frank A. Best, Windsor, Ontario, Canada

Application December 21, 1936, Serial No. 117,059

5 Claims. (Cl. 74—558)

This invention relates to steering wheel covers and has as one of its principal objects to provide an improved cover capable of being quickly applied to and removed from the rim of a steering wheel.

Another object of this invention consists in the provision of a pliable cover adapted to be stretched over the rims of the steering wheel and embodying means for gripping the rim of the wheel to such an extent as to prevent slipping of the cover relative to the steering wheel.

A further feature of this invention resides in the provision of a fabric cover for the rim of a steering wheel having means for holding the cover under tension in assembled relation with the rim and having a layer of latex on the inner surface of the fabric engageable with the rim of the steering wheel to prevent slipping of the fabric cover relative to the rim.

The foregoing, as well as other objects, will be made more apparent as this description proceeds, especially when considered in connection with the accompanying drawing, wherein:

Figure 1 is a top plan view of a steering wheel equipped with a fabric cover constructed in accordance with this invention;

Figure 2 is an enlarged cross sectional view taken substantially on the plane indicated by the line 2—2 of Figure 1; and Figure 3 is a fragmentary elevational view of the inside of the cover shown in Figure 1.

Referring now more in detail to the drawing, it will be noted that the steering wheel 10 is of conventional construction comprising a hub 11, a rim 12 and spokes 13 connecting the rim to the hub. Steering wheels of the above type are usually formed of molded rubber, or some plastic material and, as a consequence, have a tendency to retain temperatures over a relatively long period. In cold weather, for example, the steering wheel becomes chilled and remains cold for a long period of time, while in hot weather the rim of the wheel retains the heat and causes perspiration of the operator's hands. The foregoing is a source of discomfort on the part of the operator which is overcome, in accordance with the present invention, by providing a cover 14 for the rim 12 of the steering wheel.

In the present instance, the cover 14 is formed of a strip of fabric having a length sufficient to encircle the rim of the wheel and having the longitudinal edges gathered around flexible rings 15. The rings 15 may be in the form of rubber tapes and the diameter of the tapes in the free positions of the latter is less than the internal diameter of the rim of the wheel so that when the cover is applied to the steering wheel, the same is held under tension on the rim of the wheel. It will, of course, be understood that the tapes 15 possess sufficient elasticity to permit the same to be stretched the amount required to readily assemble the cover on and remove the same from the rim of the steering wheel. From the above, it will be noted that the fabric employed in forming the cover may be selected to match the upholstering of the vehicle body and, as a matter of face, may be of the same material as the upholstering.

One of the serious problems that required solution in rendering a removable cover of the above type practical for use during operation of the vehicle, was to prevent slipping of the cover relative to the rim of the steering wheel when the operator desired to manipulate the wheel to turn the vehicle. In accordance with the present invention, the above problem is solved by applying a layer of latex 16 on the inner surface of the cover between the free edges thereof. The latex preferably extends throughout the circumference of the cover and engages the periphery of the steering wheel when the cover is applied to the rim of the latter. The particular material selected must possess the gripping qualities required to prevent slipping of the cover when a turning torque is applied thereto and must retain its coefficient of friction characteristics over a relatively long period of time. In addition, the latex employed should not mar the rim of the steering wheel and must not interfere with removal of the cover from the steering wheel. Although a number of different materials may be employed for the above purpose, nevertheless, I have found that a solution of latex rubber functions particularly satisfactorily in that it retains its coefficient of friction over a long period of time and possesses all of the advantages required to make the cover commercially practical.

Thus, from the foregoing, it will be observed that I have provided a relatively simple and inexpensive cover for the rim of a steering wheel capable of being readily applied to and removed from the latter. It will also be apparent that my improved cover will effectively grip the rim of the steering wheel and prevent slippage when torque is applied thereto.

What I claim as my invention is:

1. A cover for a rim of a steering wheel capable of being quickly applied to and removed from said rim and comprising inner and outer concentric strip-like rings arranged in face to face relation and adapted to embrace said rim, the outer ring being wider than the inner ring and formed of fabric for engagement with the hands of an operator of the steering wheel, said outer ring being provided at the free longitudinal edges thereof with means for holding the cover under tension on said rim, and the inner ring being formed of latex and adhering to said outer ring, said inner ring of latex being adapted to embrace the rim of said wheel and having sticky, clining characteristics for holding the cover against slippage relative to said rim.

2. A cover for a rim of a steering wheel capable of being quickly applied to and removed from said rim and comprising an embracing strip-like ring of substantially U-cross-section provided along the free longitudinal edges of the U with means for holding said ring under tension upon said rim, and provided along the base of the U with a narrower strip-like lining to prevent slippage of the ring relative to the rim, said ring being formed of fabric for engagement with the hands of an operator of the steering wheel, and the lining being formed of tacky, uncured rubber having a high coefficient of friction for clinging engagement with the rim of said wheel.

3. A cover for a rim of a steering wheel capable of being quickly applied to and removed from said rim and comprising a strip-like fabric ring substantially U-shape in cross section having a length sufficient to encircle the rim and a width sufficient to embrace the rim, means for maintaining the longitudinal edges of said cover under tension including separate rings of flexible material extending circumferentially of and secured to the free longitudinal edges of said ring, one at each longitudinal edge, the diameter of said flexible rings in the free position thereof being less than the internal diameter of the rim so that the cover will be held under tension by said flexible rings when applied to a rim, and means for preventing said cover from slipping relative to said rim when applied thereto including a strip-like ring of latex extending circumferentially of the base of the U for engagement with the rim of said wheel, said ring of latex adhering in face-to-face relation to the fabric ring and being substantially centered with respect to the longitudinal edges thereof, said latex ring having the tacky characteristics of uncured rubber for clinging engagement with said rim.

4. A cover for a rim of a steering wheel capable of being quickly applied to and removed from said rim and comprising a strip-like fabric ring substantially U-shape in cross section having a length sufficient to encircle the rim and a width sufficient to embrace the rim, means for maintaining the longitudinal edges of said cover under tension including separate rings of flexible material extending circumferentially of and secured to the free longitudinal edges of said ring, one at each longitudinal edge, the diameter of said flexible rings in the free position thereof being less than the internal diameter of the rim so that the cover will be held under tension by said flexible rings when applied to a rim, and means for preventing said cover from slipping relative to said rim when applied thereto including a layer of latex on the inner surface of said fabric ring at the base of the U and providing said inner surface with a relatively high coefficient of friction, said layer of latex having the tacky characteristics of uncured rubber for clinging engagement with said rim.

5. A cover for a rim of a steering wheel capable of being quickly applied to and removed from said rim and comprising a laminated structure adapted to embrace said rim, the outer ply of said structure being wider than the inner ply and formed of fabric for engagement with the hands of an operator of the steering wheel and being wider than the inner ply, said outer ply being provided at its free longitudinal edges beyond the longitudinal edges of the inner ply with means for holding the structure under tension on said rim, and the inner ply being formed of latex and entirely free of said tensioning means, said inner latex ply having tacky characteristics of uncured rubber for clinging engagement with said rim.

FRANK A. BEST.